United States Patent Office 3,099,289
Patented July 30, 1963

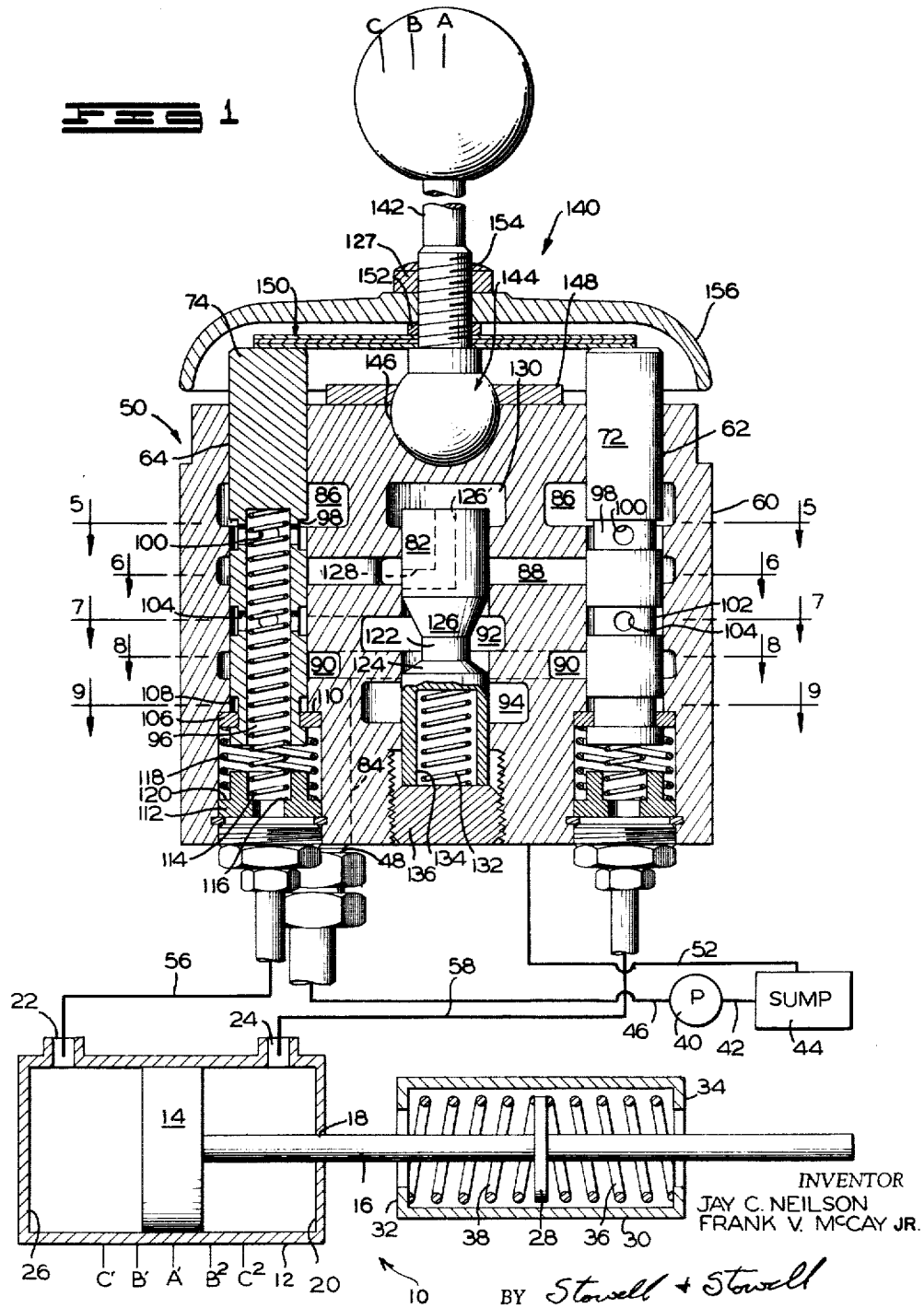

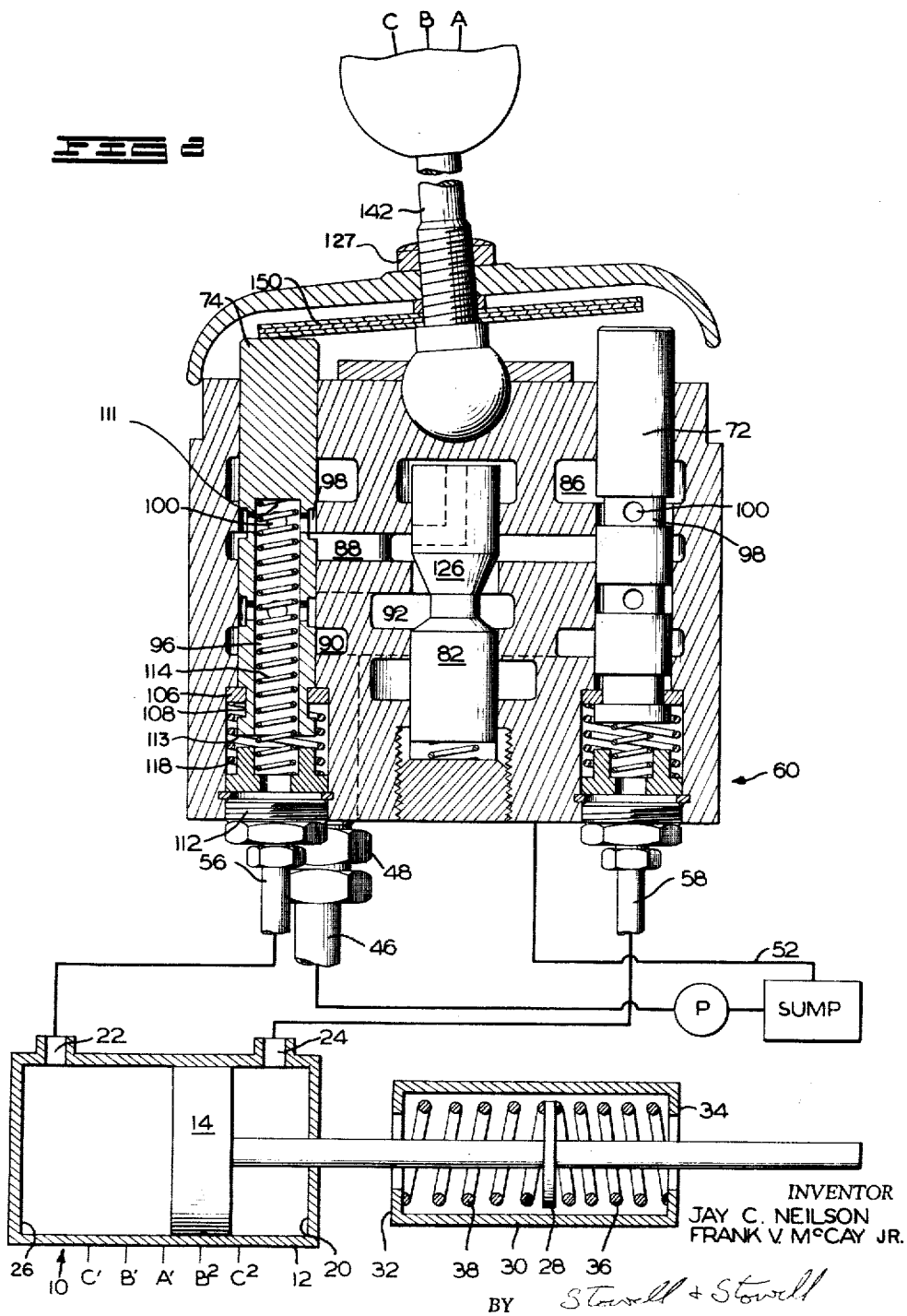

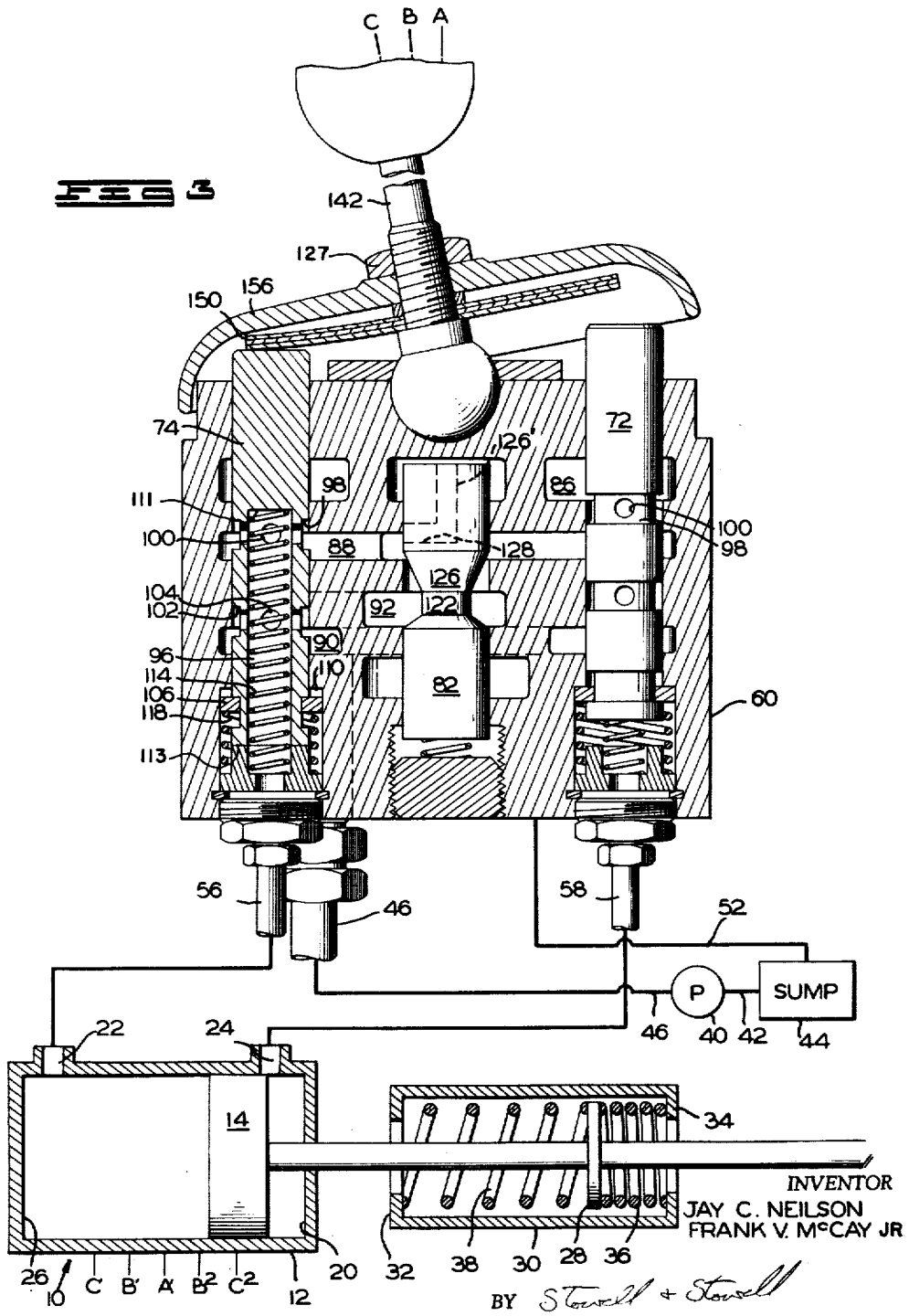

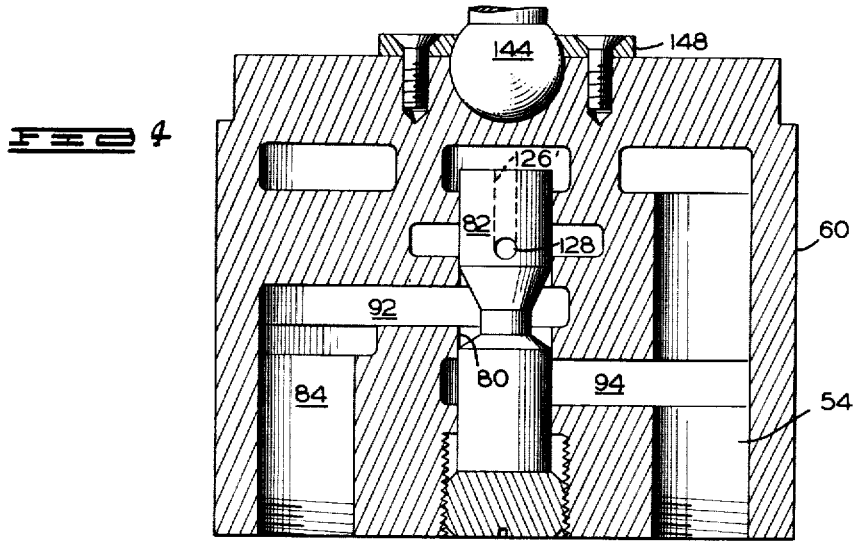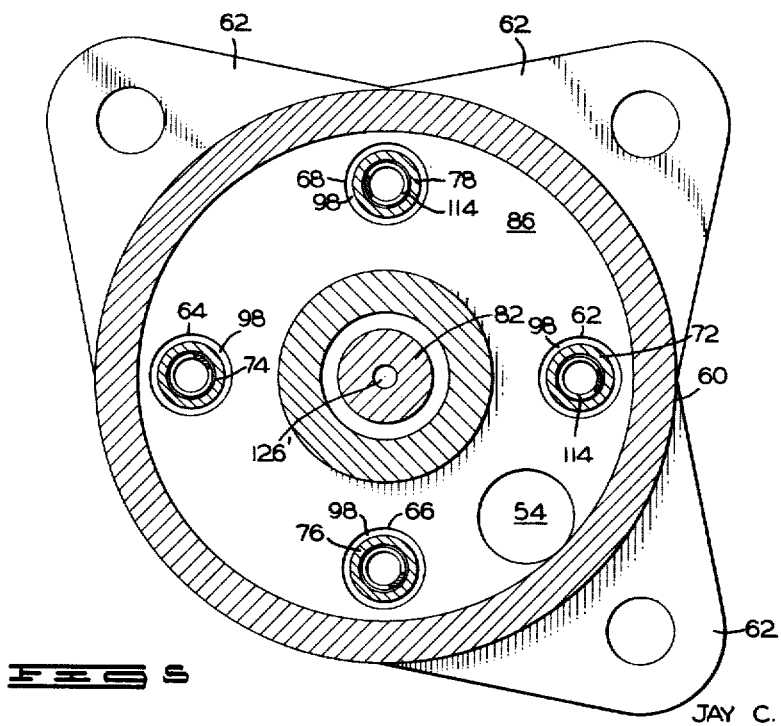

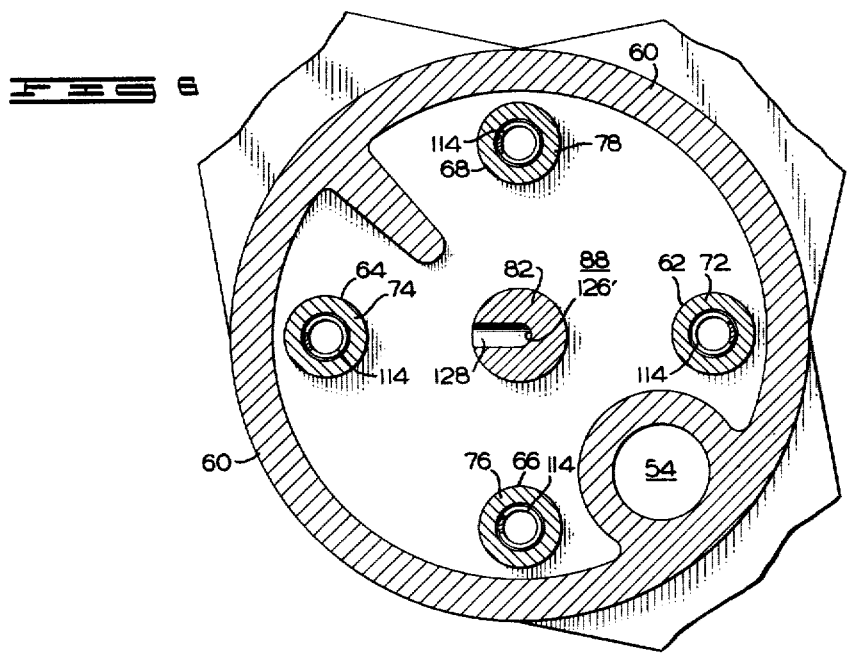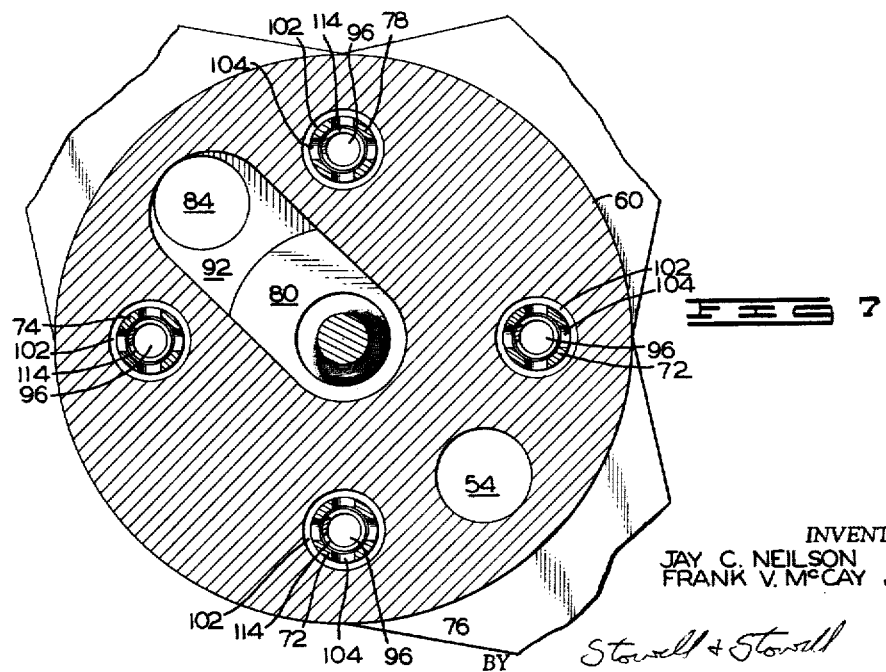

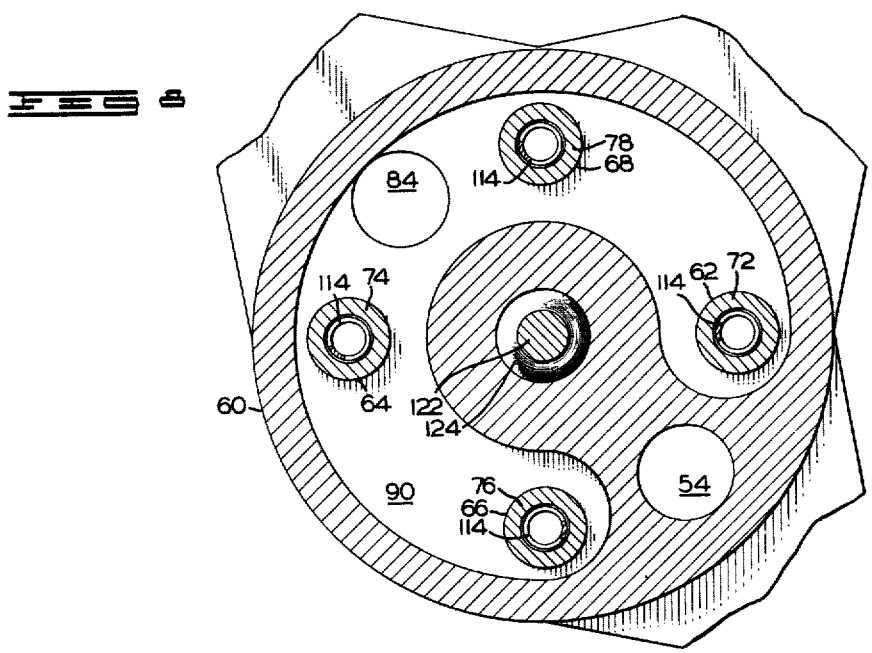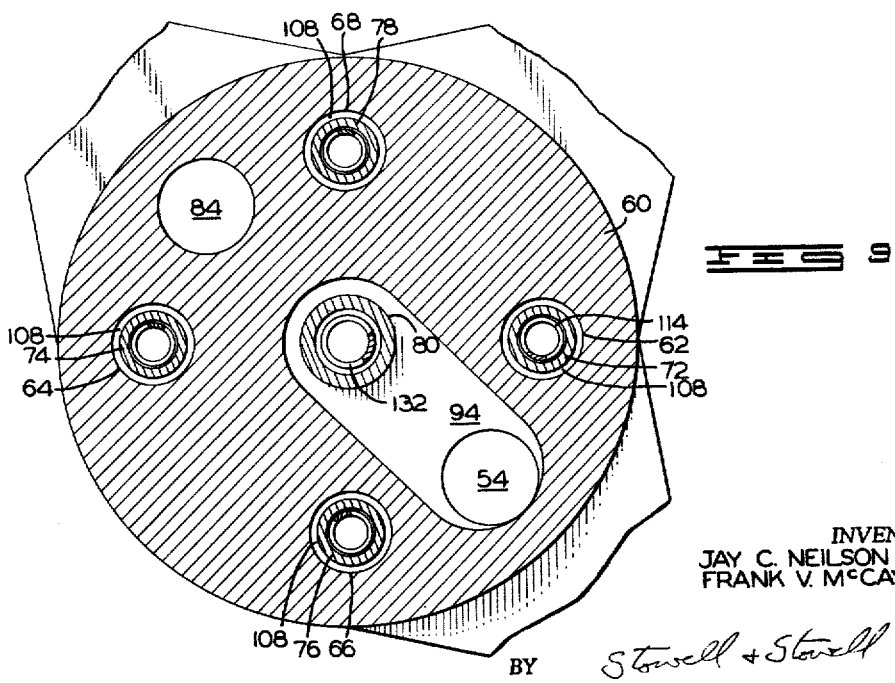

3,099,289
PRESSURE FLUID CONTROL SYSTEM AND
FLOW CONTROL MEANS THEREFOR
Jay C. Neilson and Frank V. McCay, Jr., Salt Lake City,
Utah, assignors to Zeno Hydraulic Corporation, Salt
Lake City, Utah, a corporation of Nevada
Filed June 20, 1960, Ser. No. 37,256
7 Claims. (Cl. 137—596)

This invention relates to improvements in pressure fluid control systems and flow control means therefor.

It is an object of the present invention to provide a pressure fluid control system including a valve body, a single manually operable control handle, one or more pressure fluid flow control spools movably received in the valve body, resilient means between the control spools and the control handle and further means overriding the resilient means to provide for resilient and non-resilient actuation of the valve spools.

A further object is to provide such a system including pressure responsive fluid metering means to maintain valve outlet pressure relatively constant over a wide operating range.

A further object is to provide an improved pressure fluid control valve having one or more flow control spools therein and manual control means for moving the flow control spools to preselected flow control positions wherein movement of the flow control spools to certain of the positions is through resilient means interposed between the flow control spools and the manual actuator and movement to other flow control positions is through non-resilient contact between selected flow control spools and the manual actuator.

Another object is to provide a pressure fluid flow control valve including pressure responsive fluid metering means maintaining inlet pressure to the flow control spools substantially constant over a wide range of operation.

Another object is to provide in a pressure fluid flow control system and in a pressure fluid flow control valve, means by-passing a pressure responsive fluid flow metering means whereby unregulated inlet pressure may be selectively directed through certain of the flow control passages thereof.

A further object is to provide a pressure fluid flow control valve wherein the fluid flow control spools are normally urged in a direction to provide communication between pressure fluid inlet and exhaust ports and manual actuator means are provided for moving the flow control spools against the urging of the resilient means to certain flow control positions and second resilient means co-acting with the first resilient means urging the flow control spools in a direction away from other flow control positions.

A further object is to provide pressure fluid responsive means co-acting with said first resilient means to urge the flow control spools in a no-flow direction.

Another object is to provide an improved pressure fluid control valve having one or more flow control spools therein and manual control means for moving the flow control spools to preselected flow control positions wherein movement of the flow control spools to certain of the positions is through resilient means interposed between the flow control spools and the manual actuator, and pressure fluid responsive means urging said flow control spools from said certain of the flow control positions against the urging of the resilient means.

Another object is to provide such a pressure fluid control valve including further resilient means co-acting with the pressure fluid responsive means in urging said flow control spools from said certain of the flow control positions.

The pressure fluid flow control device of the present invention generally includes a body, a spool receiving bore in the body, a spool slidably received in the bore in the body, a pressure fluid groove and an exhaust fluid groove in the spool receiving bore in the body, a pressure fluid and exhaust groove in the spool slidably received in the spool receiving bore, a pressure fluid metering chamber in the valve body, first passage means connecting the chamber to a source of pressure fluid, second passage means connecting the chamber and the pressure fluid groove of the spool receiving bore, pressure fluid responsive valve means in the chamber between the first and second passage means, an exhaust fluid bore in the body connecting sump means with the exhaust fluid groove in the spool receiving bore, resilient means urging the spool in a direction to provide communication between the groove on the spool and the exhaust fluid groove in the spool receiving bore, and manual control means for selectively moving the spool against the urging of the resilient means in a direction to provide communication between the pressure fluid groove in the spool receiving bore and the groove in the spool.

The invention also generally comprises a pressure fluid control system including a pressure fluid actuated motion device, a control valve, the control valve including a body, at least a pair of spool receiving bores in the body, a spool slidably received in each of the spool bores, a pressure fluid groove and an exhaust groove in each of the spool receiving bores, a pressure fluid and exhaust groove in each of the spools, a pressure fluid metering chamber in the body, first passage means connecting the chamber to a source of pressure fluid, second passage means connecting the chamber and the pressure fluid grooves of each of the spool receiving bores, pressure fluid responsive valve means in the chamber between the first and second passage means, an exhaust fluid bore in the body connecting sump means with the exhaust fluid grooves in each of said spool receiving bores, a valve spool controlled pressure fluid inlet and outlet port for each of the spool receiving bores in the body, conduit means connecting a pressure fluid actuated motion device to each of the pressure fluid and exhaust ports in said valve body, resilient means urging each of the spools in a direction to provide communication between the grooves on the spools and the exhaust fluid grooves in the spool receiving bores, and manual control means for independently and selectively moving said spools against the urging of the resilient means in a direction to provide communication between the pressure fluid grooves in each of the spool receiving bores and the grooves in said spools for selectively directing pressure fluid from the source of fluid through the pressure fluid control device to and from the pressure fluid actuated motion device.

The invention also generally comprises a control valve including a valve body having at least one spool receiving bore therein, a flow control spool slidably received in the spool bore, a manual actuator for the spool and resilient means urging the spool toward the actuator characterized in that the actuator includes a movable control handle, resilient means connecting the control handle and the valve spool, and rigid means carried by the control handle and adapted to move the valve spool when the resilient force of the resilient spool urging means overcomes the resilient force of the resilient means interconnecting the control handle and the valve spool.

Further objects and advantages of the present invention will appear from the following description and appended claims when read in conjunction with the attached drawings wherein:

FIG. 1 is a partially diagrammatic and sectioned view of a pressure fluid control system embodying the improved pressure fluid control valve and valve actuator of the present invention;

FIGS. 2 and 3 are fragmentary sectional views through the pressure fluid control valve shown in FIG. 1 with the valve spools in different operating positions;

FIG. 4 is an enlarged sectional view through the pressure fluid control valve illustrated in FIG. 1 substantially on line 4—4 of FIG. 7;

FIG. 5 is a transverse section substantially on line 5—5 of FIG. 1;

FIG. 6 is a transverse sectional view substantially on line 6—6 of FIG. 1;

FIG. 7 is a transverse sectional view substantially on line 7—7 of FIG. 1;

FIG. 8 is a transverse sectional view substantially on line 8—8 of the control valve illustrated in FIG. 1; and FIG. 9 is a transverse sectional view substantially on line 9—9 of the pressure fluid control valve illustrated in FIG. 1.

Referring to the drawings and in particular to FIG. 1 thereof, the pressure fluid control system of the invention includes a pressure fluid actuated motion device generally designated 10. The motion device 10 comprises a conventional cylinder 12 having slidably mounted therein a piston 14. The piston is provided with a piston rod 16, one end of which passes through a suitable opening 18 in one of the heads 20 of the cylinder 12. The cylinder 12 is also provided with a pair of pressure fluid inlet and exhaust ports 22 and 24 adjacent heads 26 and 20, respectively.

In the illustrated form of the invention the motion device 10 is of the self-centering type and the piston rod 16 has secured thereto a stop member 28 which stop member reciprocates in a cylindrical housing 30 having head members 32 and 34 through which the piston rod 16 reciprocates. Between the inner surface of head 34 and one of the faces of stop member 28 is maintained a helical spring 36. A similar helical spring 38 bears at one end against the opposite face of stop member 28 while its other end engages the inner surface of head 32.

From the foregoing description, it will be seen that as the piston 14 is displaced from its centered position on line A toward position B¹ or B² spring 36 or 38 is compressed by movement of the stop member 28 in the same direction as the piston 14. It will further be appreciated that as the piston moves from, for example, position B¹ to position C¹ or position B² to position C², a greater force is required than is required in the initial movement of the piston to position B¹ or B² due to the increased resilient force of spring 36 or spring 38 as the springs become more and more compressed.

Presure fluid for actuating the motion device 10 is provided in the illustrated form of the invention by a conventional hydraulic pump generally designated 40. The inlet side of pump 40 is connected by conduit 42 to a sump or hydraulic reservoir 44. The outlet side of pump 40 is conncted by conduit 46 to an inlet bushing 48 secured to the novel pressure fluid flow control valve means generally designated 50. Return pressure fluid from the valve is via conduit 52 which connects the outlet or exhaust passage 54 of the valve, more clearly shown in FIG. 4 of the drawings, with the hydraulic reservoir 44. The cylinder 12 of the motion device is connected to a pair of control spools of the valve 50 through pressure fluid inlet and exhaust lines 56 and 58 as to be more fully described hereinafter.

The pressure fluid flow control valve 50 includes a body portion generally designated 60 having about its base a plurality of mounting flanges 62. The upper portion of the valve body 60 is cylindrical in form and in the form of the invention illustrated in the drawings, the valve body 60 is provided with four equally spaced cylindrical bores 62, 64, 66 and 68, each of which bores slidably receives a flow control valve spool 72, 74, 76 and 78, respectively.

While the valve 50 is illustrated as having four flow control spools, only spools 72 and 4 are employed in the actuation of the motion device 10. The other pair of spools 76 and 78 are provided for the actuation of a further motion device, not shown in the drawings, which may be identical to motion device 10. It will be further appreciated from the following detailed description of the presure fluid control means that the objects of the invention may be accomplished with a valve having only a single flow control spool and a greater number than four spools may be incorporated in the body structure 60 without interfering with the operation of the improved structure.

The valve body 60 is also provided with a radially extending and centrally positioned bore 80 which bore is adapted to slidably receive a pressure fluid responsive flow metering spool 82. The valve body also has an axial bore 84, which has communication at its lower end with pressure fluid inlet bushing 48, and bore or passage 54 hereinbefore referred to as the exhaust passage which has connection to exhaust line 52 between the valve body 60 and the hydraulic reseroir 44.

In addition to the axial bores, the valve body is provided with three primary transversely extending passages generally designated 86, 88 and 90 more clearly shown in FIGS. 5, 6 and 8, respectively. Transverse pasage 86 communicates with the upper end of the axially extending exhaust fluid bore 54 and with each of the spool receiving bores 62, 64, 66 and 68 thereby providing exhaust fluid grooves in each of the spool receiving bores.

Extended transverse passage 88 communicates with each of the spool receiving axial bores 62, 64, 66 and 68 and also with the bore receiving the pressure responsive flow control means 80 as illustrated in FIG. 6 of the drawings. The transverse passage 88 forms with the bores receiving the flow control spools 62, 64, 66 and 68 metered pressure fluid inlet grooves.

Extended transverse passage 90 as illustrated in FIG. 8 communicates with the pressure fluid inlet bore 84 and each of the spool receiving bores 62, 64, 66 and 68 and provides unmetered pressure fluid inlet grooves for each of the spool receiving bores.

The valve body 60 is also provided with a pair of transverse passages which do not intersect any of the axial control spool receiving bores. One of these transverse passages is designated 92 and is illustrated in FIGS. 4 and 7 and the other is designated 94 and is illustrated in FIGS. 4 and 9. Transverse passage 92 interconnects the pressure fluid inlet bore 84 with the bore 80 for the pressure fluid flow metering spool 82 while transverse passage 94 connects the axially extending exhaust bore 54 and the axially extending bore 80 for the metering valve structure 82.

Each of the flow control spools 72, 74, 76 and 78 is provided with an axially extending bore 96 which bore extends from the lower end of each spool upwardly to cooperate with a flow control groove 98. Each flow control groove 98, on each of the valve spools, is placed in communication with its respective axial bore 96 through one or more transverse bores 100.

The axial bore 96 in each of the valve spools 72, 74, 76 and 78 is also in communication with a flow control groove 102 on each valve through radial bores 104 connecting the axial bores and their respective groove 102.

Each of the valve spools is maintained in its respective axial bore by a lock nut or ring 106 which engages a groove 108 in each of the spools and a shoulder 110 adjacent the lower end of the bore of each of the axial spool receiving bores. The lock nut 106 cooperates with an annular base plug 112 received in the lower end of each of the spool bores.

Each of the flow control spools is biased in a direction away from its base plug 112 by a helical compression spring 114 which engages at its lower end a shoulder 116 on each of the base plugs 112 and engages at its upper end the upper end of each of the axial bores 96 in the valve spools. Further, each of the flow control spools is provided with a further helical spring 118, the lower end of which engages shoulder 120 on each respective base plug member 112 while the upper end engages the lower surface of each of the lock rings 106. With this form of construction, each of the spools 72, 74, 76 and 78 may be urged downwardly against the tension in their respective springs 100, a distance equal to the difference between the width of lock nut receiving groove 108 and the width of the lock nut 106. As soon as the defined limit of travel is reached, further downward movement of each of the slidably mounted spools is resisted by the combined force of its helical spring 114 and helical spring 118 as continued movement of each of the spools in a downwardly direction also causes sliding movement of its lock nut 106, thereby compressing helical spring 118 acting between the lower surface of its lock nut and the upper surface of the shoulder 120 on each of the base plugs 112.

As hereinbefore described, the flow control valve 50 is provided with a pressure fluid responsive metering valve 82. The metering valve 82 is provided with an extended groove 122 provided with tapered sides 124 and 126. The spool 82 is also provided with an axial bore 126' which bore intersects one or more radial bores 128. The axial bore 126' communicates with a chamber 130 provided in the valve body 60 which chamber acts as a pressure pot and coacts with a helical spring 132 received in an axial bore 134 provided in the base of the metering valve spool 82. The upper end of the helical spring 132 bears against the upper surface of the bore 134 and the lower end of the spring bears against a plug 136 which maintains the metering spool assembly 82 within its bore. The plug 136 also determines the lowest position of the spool 82.

The spools 72, 74, 76 and 78 of the valve are manually shifted against the urging of the biasing springs provided adjacent the lower ends thereof and the pressure fluid acting against surfaces 111 and 113 on each valve spool by a manual actuator generally designated 140. The manual actuator includes a handle portion 142, the lower end of which is provided with a generally spherical surface 144 which spherical surface engages a spherical opening 146 in the top of the valve body 60. A plate member 148 also provided with a spherical opening therein maintains the ball 144 in the spherical opening 146 in the valve body. The handle portion 142 of the manual control means mounts a circular spring member 150 which spring member is composed of laminated spring sheets having a diameter large enough to engage the top surface of each of the flow control spools 72, 74, 76 and 78. The circular spring means 150 is maintained in fixed relationship on the control handle 142 by a lock nut 152 which engages cooperating threads 154 on the shank of the control handle 142.

The control assembly also includes a non-resilient cover plate 156 which cover plate is provided with a central bore having threads thereon which mate with the threaded portion 154 of the control handle. The non-resilient plate means 156 and its lock nut 127 are threaded onto the control handle so that the lower surface of the plate 156 engages the upper surface of the lock nut 152, thus providing a fixed space between the lower surface of the plate 156 and the upper surface of the circular leaf spring means 150 when the control handle is in the position illustrated in FIG. 1.

Operation

Operation of the improved pressure fluid control valve and system will be particularly described with reference to FIGS. 1, 2 and 3 wherein in FIG. 1, the control handle and the associated valve spools are in the neutral position; in FIG. 2 the control handle has been moved to the left to position B to urge flow control spool 74 to the first flow control position; and in FIG. 3 the control handle has been moved to a further position C whereby the flow control spool 74 is moved to a second flow control position while the other flow control spools are maintained in the neutral position.

Pressure fluid from the output of the pump 40 is directed via conduit 46 to the inlet bushing 48 to flow upwardly through the pressure fluid inlet bore 84 into transverse passages 90 and 92 illustrated in plan in FIGS. 8 and 7, respectively. The flow of pressure fluid through transverse passage 90 is blocked when the flow control spools 72, 74, 76 or 78 are in the neutral position illustrated in FIG. 1 as there is no flow control groove on the valve spools in communication with the pressure fluid in the transverse passage 90.

Pressure fluid from pressure fluid inlet 84 flowing to transverse passage 92 and about the tapered groove 122 of the flow metering valve spool 82 momentarily flows into transverse passage 88 illustrated in FIG. 6 of the drawings. With the flow control valve spools 72, 74, 76 and 78 in the neutral position, flow from transverse passage 88 about the flow control spools is blocked. However, some of the pressure fluid enters bore 128 and bore 126' in the metering valve 82 and into the pressure pot 130. As the pressure in pressure pot 130 builds up, the metering valve 82 is forced downwardly against the force of spring 132 adjacent the lower end of the spool, closing off flow of the pressure fluid from transverse passage 92 about the tapered surface 126 into transverse passage 88. Thus, while all of the flow control spools 72, 74, 76 and 78 are in the neutral position illustrated in FIG. 1, the metering valve 82 maintains a balance of pressure between the metering spring 132 and the pressure in pressure pot 130.

Shifting the control handle 142 to the position B as illustrated in FIG. 2, circular leaf spring 150 urges flow control spool 74 downwardly against the force of helical spring 114. Movement of the control spool 74 in a downward direction is limited to the movement permitted by the groove 108 engaged by the locking ring 106. This downward movement of control spool 74 brings flow control groove 98 of spool 74 into communication with transverse passage 88 in the valve body whereby pressure fluid entering inlet bore 84 flows into transverse passage 92, about the tapered control surface 126 of metering valve 82, thence into transverse passage 88, into groove 98 of spool 74, through bores 100 of said spool, thence through the bore 96 in spool 74, through the annular base plug 112, through conduit 56 and into the cylinder 12 adjacent cylinder head 26 to force the piston 14 against the compression of spring 36 to the position designated $B^2$. The piston 14 is maintained in the position $B^2$ when the control handle is in position B in part by the pressure fluid flowing about the metering valve 82 which is maintained at a predetermined pressure by the metering spring 132, and the pressure in the pressure pot 130, which are, in general, regulated to balance with the force of spring 36 when the piston is in position $B^2$.

However, it will be particularly noted that further control is provided by automatic movement of the control spool 74, against the resilient force of spring 150, to the no-flow position by the combined force of helical compression spring 114 and the back pressure of the pressure fluid acting against valve spool surfaces 111 and 113.

Thus, when the pressure of the pressure fluid acting against spool surfaces 111 and 113 plus the force of spring 114 overcome the force exerted on the spool by circular spring means 150, the valve spool moves to block flow of pressure fluid from transverse passage 88 and the piston 14 will remain stationary until the control handle is returned to the neutral or centered position or, as to be more fully described hereinafter, until the control handle is moved to position C.

Hydraulic fluid on the opposite side of the piston 14 between the piston and the cylinder head 20 flows out of cylinder outlet 24, through conduit 58 and into the hollow bore of fluid control spool 72, thence out of bore 100 of spool 72, about groove 98 of said spool and into exhaust passage 86, thence through exhaust outlet bore 54 in the valve body to return to the reservoir 44 through hydraulic line 52.

Where it is desired to bring about further movement of piston 14 to the $C^2$ position, the control handle is moved to position C as illustrated in FIG. 3 of the drawings. It will be noted that the combined force of springs 114 and 118 urging flow control spool 74 in the upward direction is greater than the resilient force of circular spring 150 carried by the control handle 142. In urging flow control spool 74 to the second flow control position, the spring 150 is urged upwardly into contact with the inner surface of the non-resilient cap portion 156 of the control handle assembly. With the circular spring 150 in contact with the inner surface of the cap portion 156, a non-resilient force then urges the flow control spool 74 downwardly against the force of springs 114 and 118, moving the lock ring 106 away from the shoulder 110 of the bore in the valve body. With the flow control spool 74 in this position, pressure fluid from the pump 40 passes through pressure fluid conduit 46, into inlet bore 84 and transverse passages 90 and 92, through the axial bore 96 in the valve spool 74 and through the groove 102 and the bores 104 of the valve spool 74. It will also be noted that bores 100 and groove 98 of valve spool 74 remain in communication with transverse passage 88; however, since unmetered pressure fluid is admitted to bore 96 of the valve spool 74 and thence through opening 100 into transverse passage 88 and bores 128 and 126' of metering valve 82, the increase in pressure in pressure chamber 130 forces metering valve 82 downwardly against its spring 132 closing off the source of metered pressure fluid.

The unmetered pressure fluid from passage 90 entering the central bore 96 of spool 74 urges the piston 14 to the $C^2$ position upon further compression of spring 36. Pressure fluid between the head 20 of cylinder 12 and the other face of piston 14 flows from outlet 24, through conduit 58 to the flow control valve 72, thence out of bore 100 in said flow control spool, about its groove 98 into transverse exhaust passage 86, thence out of the valve through axial exhaust bore 84 and to the sump 44 via exhaust line 52.

It will also be noted that when unmetered pressure fluid is admitted to the valve spools the combined force of helical compression springs 114 and 118 and the force of pressure fluid acting on spool surfaces 111 and 113 will not urge the spool to a no-flow position as the spool is urged downwardly by the non-resilient plate members 156.

Movement of the control handle 142 in the opposite direction to actuate flow control valve spool 72 brings about corresponding movement of the piston 14 in the cylinder 12 in the opposite direction.

In the description of the operation of the valve, valve spools 76 and 78 have not been specifically referred to. This pair of flow control spools may be connected to a further double acting motion device of the type illustrated at 10 in the drawings and movement of the control handle 142 at right angles to the illustrated movements would bring about corresponding actuation of the second motion device. And as hereinbefore set forth, the improved flow control valve means 50 may contain additional pairs of flow control spools which may be actuated in unison or selectively through the single control handle.

It will also be apparent that the four-spool valve illustrated in the drawings may be connected to four motion devices where the motion devices are single-acting or where the return direction of movement of the armature is brought about by spring means or other actuating mechanisms.

From the foregoing description, it will be particularly noted that when the control handle is in the B position, the first flow control position for the flow control spool 72, 74, 76 or 78, the spools may return to the neutral position, or a position blocking the flow of pressure fluid from transverse passage 88 into the spool grooves 93, by the combined force of springs 114, and back pressure from the motion device 12 acting against and overcoming the force of circular leaf spring member 150. However, when the control handle is positioned in the C position and the flow control spools or spool are urged to the second flow control positions by the non-resilient contact between the upper surface of the spools, the resilient spring 150 and the inner surface of the plate member 156, back pressure acting against the flow control spools will not urge the spools to a non-selected position.

It will also be noted that the arrangement of the resilient and non-resilient actuating means for the flow control spools provides an automatic neutral position return means for the manual control handle 142.

From the foregoing description, it will be seen that there is provided a pressure fluid control system which fully accomplishes each of the objects and advantages hereinabove set forth and there is provided an improved flow control valve means having new manual actuator means for the flow control spools thereof. While there has been shown and described an illustrative embodiment of the present invention, various changes and modifications may be made therein without departing from the spirit and scope of the invention as defined in the appended claims.

We claim:

1. A pressure fluid flow control device including a body, a spool receiving bore in the body, a spool slidably received in said bore in the body, a pressure fluid passage and an exhaust fluid passage communicating with the spool receiving bore in said body, a pressure fluid and exhaust groove in the spool slidably received in the spool receiving bore, a pressure fluid metering chamber in the body communicating with the pressure fluid passage, passage means connecting the chamber to a source of pressure fluid, pressure fluid responsive valve means in the chamber controlling communication between the passage means and the pressure fluid passage, an exhaust fluid bore in the body connecting sump means with the exhaust fluid passage, resilient means urging the spool in a direction to provide communication between the groove on the spool and the exhaust fluid passage in the spool receiving bore, actuator means for selectively moving the spool against the urging of the resilient means in a direction to provide communication between the pressure fluid passage in the spool receiving bore and the groove in the spool, a further pressure fluid groove in the spool slidably received in the spool receiving bore, and a further pressure fluid passage connecting the source of pressure fluid and said spool receiving bore bypassing the pressure fluid metering chamber, said resilient means normally urging said further pressure fluid groove out of communication with said further pressure fluid passage, and said further pressure fluid groove being urged into communication with said further pressure fluid passage by said actuator means, said actuator means for selectively moving the spool against the urging of the resilient means including a control handle, resilient means connecting the control handle and the flow control spool, and rigid means carried by the control handle and adapted to contact the flow control spool through the resilient means when the resilient force of the resilient spool urging means overcomes the resilient force of the resilient means interconnecting the control handle and the flow control spool.

2. A pressure fluid control device including a body, at least a pair of spool receiving bores in said body, a spool slidably received in each of said spool receiving bores, a pressure fluid passage, and an exhaust fluid passage communicating with each of the spool receiving bores, a pressure fluid and exhaust groove in each of said spools, a pressure fluid metering chamber in the body communicating with the fluid pressure passage, passage means connecting said chamber to a source of pressure fluid, pressure fluid responsive valve means in said chamber controlling communication between the passage means and the pressure fluid passage, an exhaust fluid bore in said body connecting sump means with the exhaust fluid passage, resilient means urging each of said spools in a direction to provide communication between the grooves on said spools and the exhaust fluid passage, actuator means for independently and selectively moving said spools against the urging of the resilient means in a direction to provide communication between the pressure fluid passage and the grooves in said spools, a further pressure fluid groove in each of the spools slidably received in the spool receiving bores, a further pressure fluid passage connecting the source of pressure fluid and said spool receiving bores bypassing the pressure fluid metering chamber, said resilient means normally urging said further pressure fluid groove in each of the spools out of communication with said further pressure fluid receiving passage, and urged into communication therewith by said actuator means, said actuator means for selectively moving each of the spools against the urging of the resilient means including a control handle, resilient means connecting the control handle and each of the flow control spools, and rigid means carried by the control handle and adapted to contact the flow control spools through the resilient means when the resilient force of the resilient spool urging means overcomes the resilient force of the resilient means interconnecting the control handle and the flow control spools.

3. In a control valve including a valve body having at least one spool receiving bore therein, a flow control spool slidably received in the spool bore, an actuator for the spool and resilient means urging the spool toward the actuator wherein the actuator includes a movable control handle, resilient means connecting the control handle and the valve spool, and rigid means carried by the control handle and adapted to contact the valve spool through said resilient means when the resilient force of the resilient spool urging means overcomes the resilient force of the resilient means interconnecting the control handle and the valve spool.

4. In a pressure fluid control valve including a cylindrical valve body having a plurality of axial bores radially spaced in said valve body, a flow control spool slidably received in each of said valve spool bores in the body, an actuator for the flow control valve spools and resilient means urging each of the flow control spools toward the actuator wherein the actuator includes a movable control handle centrally positioned on said valve body between the spool receiving bores therein, a circular resilient plate carried by the control handle and contacting each of the flow control spools, and a rigid plate carried by the control handle and adapted to contact the flow control spools through the resilient means when the resilient force of the resilient spool urging means overcomes the resilinet force of the circular resilient means interconnecting the control handle and the said flow control spools.

5. A pressure fluid control system including a pressure fluid actuator motion device, a pressure fluid control valve, the pressure fluid control valve including a body, at least a pair of spool receiving bores in the body, a spool slidably received in each of the spool receiving bores, a pressure fluid passage and an exhaust passage communicating with each of the spool receiving bores, a pressure fluid and exhaust groove in each of the spools, a pressure fluid metering chamber communicating with the pressure fluid passage, passage means connecting the metering chamber to a source of pressure fluid, pressure fluid responsive valve means in the metering chamber controlling communication between the passage means and the pressure fluid passage, an exhaust fluid bore in the body connecting sump means with the exhaust fluid passage, a valve spool controlled pressure fluid inlet and outlet port for each of the spool receiving bores in the body, conduit means connecting the pressure fluid actuated motion device to each of the pressure fluid and exhaust ports in said valve body, resilient means urging each of the spools in a direction to provide communication between the grooves on the spools and the exhaust fluid passage, and actuator means for independently and selectively moving said spools against the urging of the resilient means in a direction to provide communication between the pressure fluid passage and the grooves in said spools for selectively directing pressure fluid from the source of pressure fluid through the pressure fluid control device to and from the pressure fluid actuated motion device, a further pressure fluid groove in each of the spools slidably received in the spool receiving bores, a further pressure fluid passage connecting the source of pressure fluid and said spool receiving bores bypassing the pressure fluid metering chamber, said resilient means normally urging said further pressure fluid groove in each of the spools out of communication with said further pressure fluid passage, said pressure fluid grooves being urged into communication with said further pressure fluid passage by said actuator means, said actuator means for selectively moving the spools against the urging of the resilient means including a control handle, resilient means connecting the control handle and the flow control spools, and rigid means carried by the control handle and adapted to contact the flow control spools through the resilient means when the resilient force of the resilient spool urging means overcomes the resilient force of the resilient means interconnecting the control handle and the flow control spools.

6. In a pressure fluid control valve including a valve body, a flow control spool receiving bore in the body, a flow control spool slidably received in the spool receiving bore, cooperating pressure fluid and exhaust passages in the valve body and said flow control spool, an actuator for the flow control spool and resilient means urging the flow control spool toward the actuator wherein the actuator includes a movable control member, spring means carried by the control member and contacting the flow control spool to urge the flow control spool from a no-flow position to certain flow control positions against the resilient force of the resilient spool urging means, and pressure fluid responsive surfaces on said flow control spool coacting with said resilient spool urging means to return the flow control spool to the no-flow position.

7. The invention defined in claim 6 including non-resilient means carried by the movable control member and adapted to contact the flow control spool through the resilient means to overcome the combined force of the resilient spool urging means and the force of the pressure fluid acting on the pressure fluid responsive surfaces on the flow control spool.

References Cited in the file of this patent

UNITED STATES PATENTS

| | | |
|---|---|---|
| 2,725,890 | Kanuch | Dec. 6, 1955 |
| 2,804,883 | Curlett | Sept. 3, 1957 |
| 2,820,372 | Edge et al. | Jan. 21, 1958 |
| 2,958,233 | Johnson | Nov. 1, 1960 |
| 3,019,816 | Larsen et al. | Feb. 6, 1962 |

UNITED STATES PATENT OFFICE
CERTIFICATE OF CORRECTION

Patent No. 3,099,289                                                            July 30, 1963

Jay C. Neilson et al.

It is hereby certified that error appears in the above numbered patent requiring correction and that the said Letters Patent should read as corrected below.

Column 9, line 68, for "actuator" read -- actuated --.

Signed and sealed this 28th day of January 1964.

(SEAL)
Attest:

ERNEST W. SWIDER

Attesting Officer

EDWIN L. REYNOLDS

Acting Commissioner of Patents